United States Patent

[11] 3,541,951

[72] Inventor Hans Ulrich Hauser-Lienhard
 Watt Zurich, Switzerland
[21] Appl. No. 754,562
[22] Filed Aug. 22, 1968
[45] Patented Nov. 24, 1970
[73] Assignee Bucher-Guyer AG Maschinenfabrik
 Niederweningen, Zurich, Switzerland
[32] Priority Aug. 25, 1967
[33] Switzerland
[31] No. 11931/67

[54] JUICE EXTRACTION PRESS
 15 Claims, 8 Drawing Figs.
[52] U.S. Cl. .................................................. 100/107,
 100/116
[51] Int. Cl. .................................................. B30b 9/02
[50] Field of Search ........................................ 100/107,
 108, 110, 111, 116, 125, 131

[56] References Cited
 UNITED STATES PATENTS
 3,207,064 9/1965 Hauser-Bucher ............. 100/107

FOREIGN PATENTS
727,248 3/1932 France.
472,285 2/1929 Germany.
424,485 5/1967 Switzerland.

Primary Examiner—Peter Feldman
Attorney—Hill, Sherman, Meroni, Gross and Simpson ABSTRACT: A juice extraction press for fruit comprises a rotary pressing basket having a cylindrical basket wall, opposite pressure and counterpressure plates and a large member of fluid pervious drain tubes extending between the two plates and opening into juice collecting chambers adjacent each plate. For removing the juice from the juice collecting chambers without the juice contacting with the atmosphere, a juice outlet pipe leads away from one of said juice collecting chambers and extends coaxially with the pressing basket, and juice conveying means are provided in said juice collecting chamber for directing the collected juice toward the juice outlet pipe. The other juice collecting chamber continuously communicates with the first mentioned juice collecting chamber.

INVENTOR.
HANS ULRICH HAUSER-LIENHARD

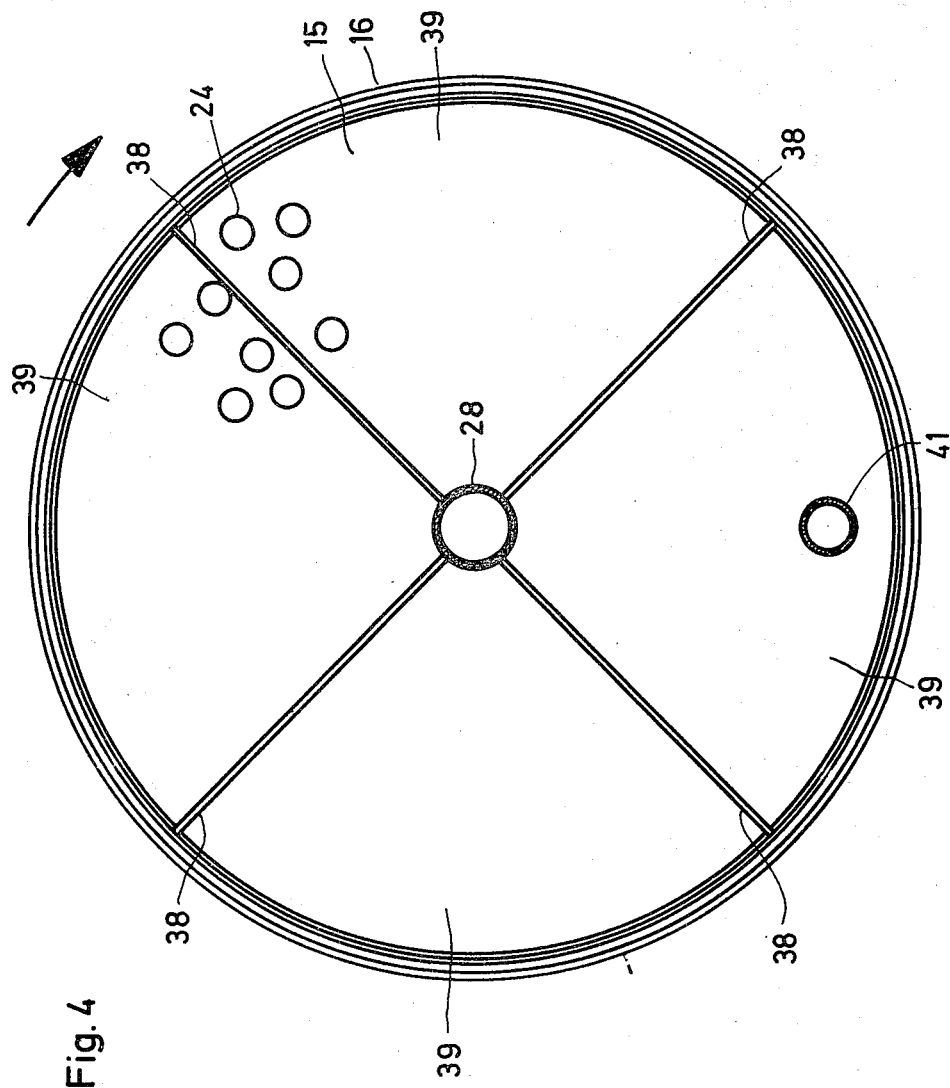

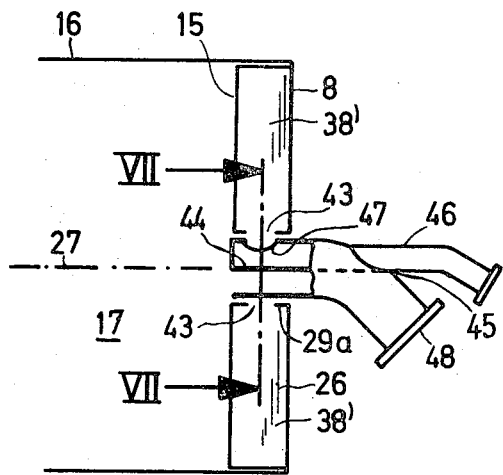
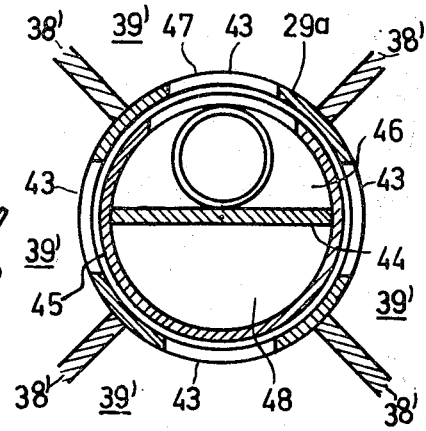
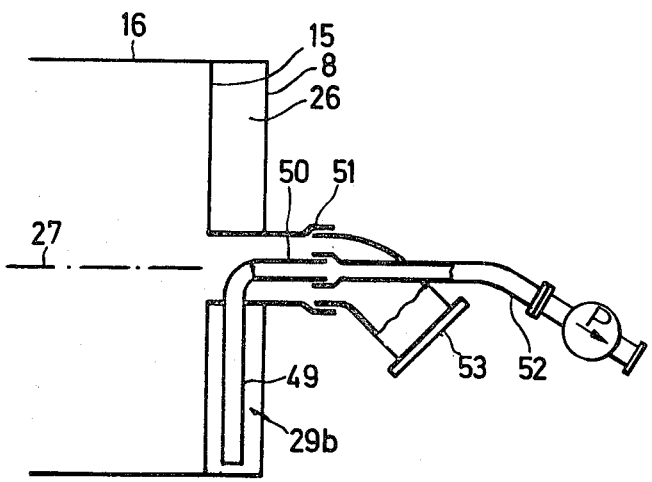
INVENTOR.
HANS ULRICH HAUSER-LIENHARD

JUICE EXTRACTION PRESS

This invention relates to a juice extraction press having a pressing basket arranged to rotate about a horizontal axis and provided with oppositely disposed pressing and a counterpressing plates disposed at the two ends of a pressing space, and with at least one juice collecting chamber situated adjacent the counterpressing plate. A further juice collecting chamber may be provided at the opposite side of the basket adjacent the pressing plate.

With juice extraction presses for fruit, grapes and the like, it is required that the extracted juice shall flow from the press to the storage place without being exposed to contact with atmosphere, so as to prevent any deteriorating action of atmospheric oxygen on the juice.

It is an object of the invention to provide a conduit system for discharging the juice from the pressing basket of the press, which is of simple construction and designed for excluding atmosphere from contact with the outflowing juice.

According to the invention a juice outlet pipe leads away from said juice collecting chamber and is extending coaxially with the horizontal axis of rotation of the pressing basket. Conveyor means provided in the juice collecting chamber deliver the extracted juice into said juice outlet pipe when the pressing basket rotates.

A juice extraction press designed according to the invention and modifications thereof are represented by way of example in the accompanying drawings.

In the drawings,

FIG. 4 is a transverse section along the line IV-IV of FIG. 1 through the juice collecting chamber adjoining the counterpressure plate.

FIG. 6 is a diagrammatic representation of a modified juice outlet and mash inlet, FIG. 7 is a transverse section along the line VII-VII of FIG. 6, drawn to a larger scale.

FIG. 8 is a further modification of a juice outlet and mash inlet.

Figure 1:
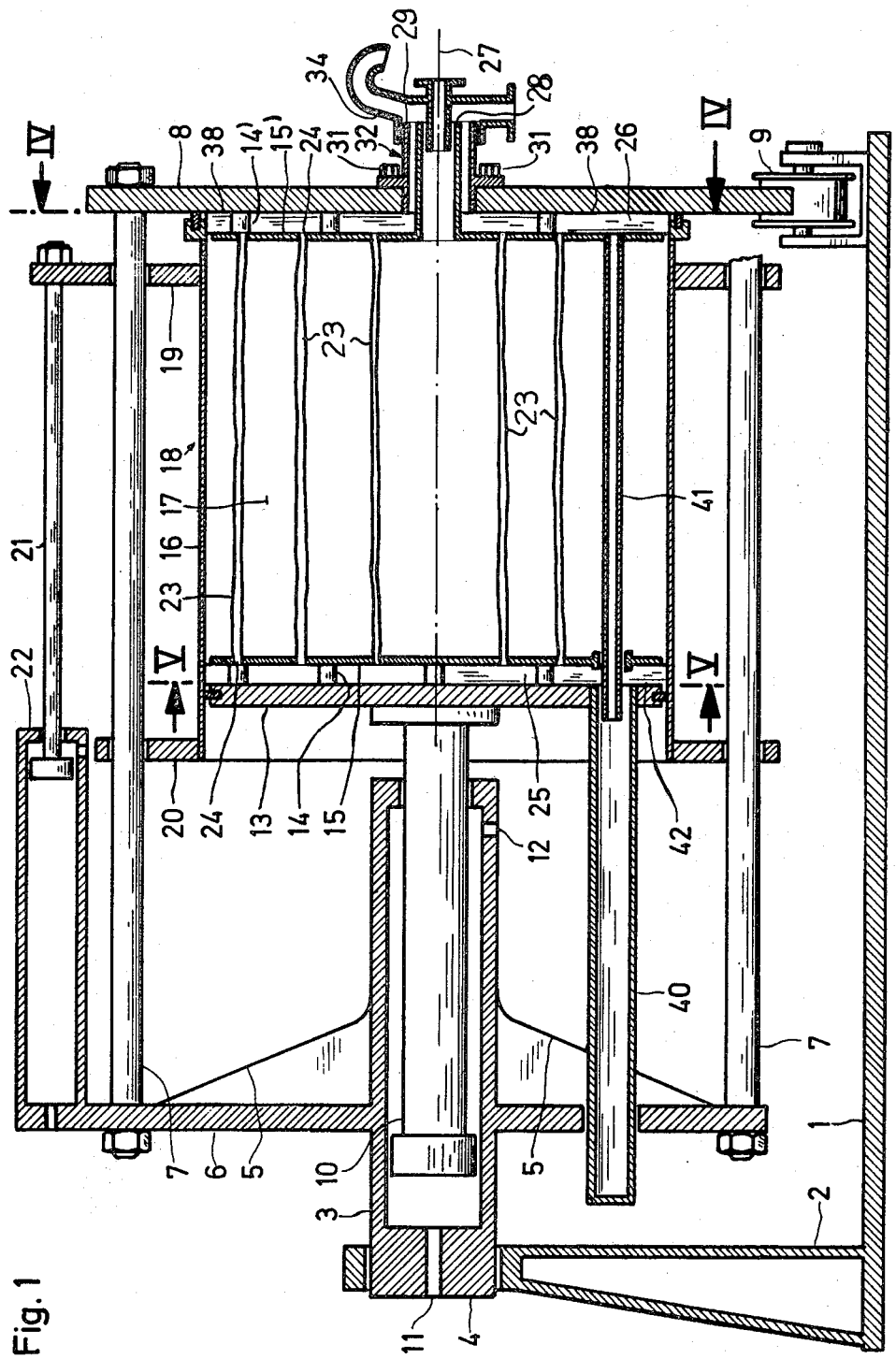
FIG. 1 represents a longitudinal, axial section through the press.

Referring to FIG. 1 a base plate 1 comprises a bearing pedestal 2 on which is rotatably mounted the head portion 4 of a pressure cylinder 3. A flange 6 reinforced by ribs 5 is secured to the pressure cylinder 3. This flange 6 is connected by means of three supporting rods 7 with a counterpressure plate 8. The rigid rotary system thus formed is rotatably mounted, on the one hand in bearing pedestal 2 and on the other hand, by the counterpressure plate 8, on two supporting rollers 9. The rotary system is rotatably driven by a driving motor, not shown. The pressure cylinder 3 contains a reciprocating differential piston 10 which is supplied with a hydraulic pressure fluid through ducts 11 and 12 provided in the cylinder head and wall. The end of the piston 10 protruding from the cylinder 3 carries a pressure plate 13 to which is detachably secured a mounting plate 15 separated by spacers 14 from the plate 13. A similar mounting plate 15' is secured on the opposite side of the press to the counterpressure plate 8 and spaced from this plate by spacers 14'.

When a stroke movement of the differential piston 10 is initiated, the pressure plate 13 moves axially within a basket cylinder 16 having its right hand end edge joined to the counterpressure plate in fluidtight manner. The counterpressure plate 8, the pressure plate 13 and the basket cylinder 16 form together a pressure basket enclosing a pressure chamber 17. The basket cylinder 16 is provided with two circular flanges 19 and 20 serving to guide the basket cylinder 16 along the supporting rods 7. Two pistons 21 reciprocate within two hydraulic cylinders 22 angularly displaced through 180°. The cylinders are rigidly connected with the flange 6, while the pistons 21 are fixed to the flange 19 of the basket cylinder 16. The two pistons are destined to axially move the basket cylinder which is guided along the supporting rods 7, according to the action of the hydraulic fluid on the pistons 21.

Within the pressure space 17 a plurality of flexible, horizontally arranged drain tubes 23 of permeable material are extended between the mounting plates 15 and 15'. When pressing out the press goods filled into the pressing space 17 the juice will collect in the juice previous drain tubes and flow out of the tubes through openings 24 in the plates 15 and 15' into juice collecting chambers 25 and 26 provided between the plate 15 and the pressure plate 13, and between the plate 15' and the counterpressure plate 8, respectively.

Figure 3:
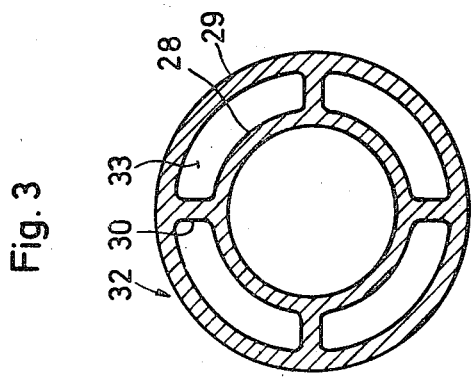
FIG. 3 is a transverse section along the line III-III of FIG. 2.
Figure 2:
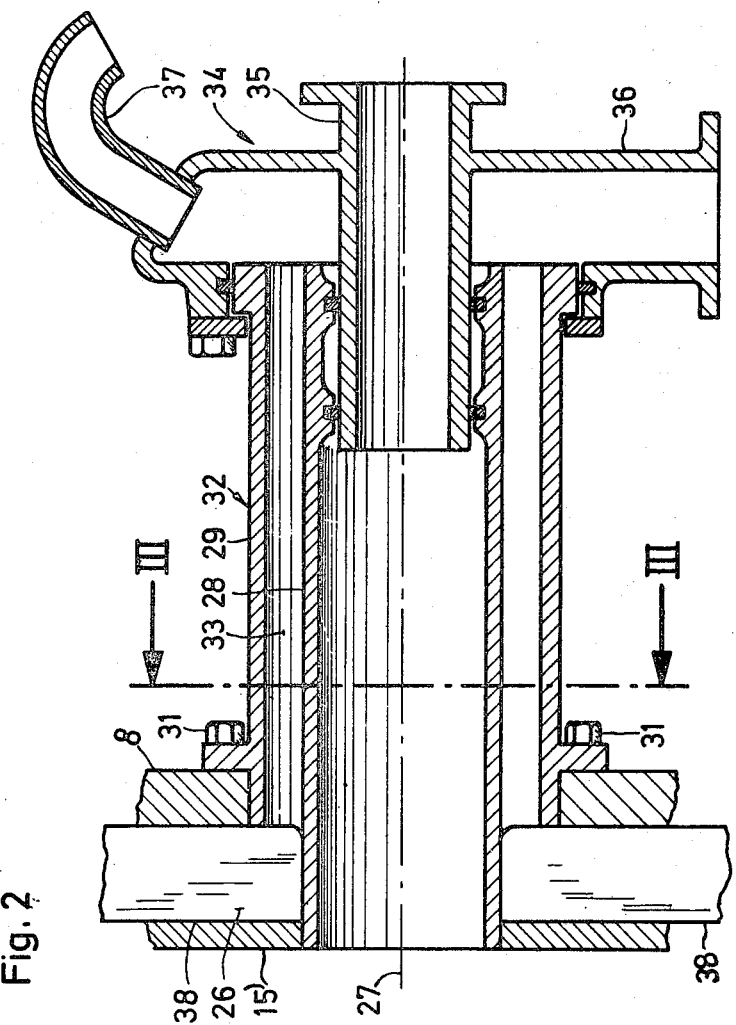
FIG. 2 shows as detail at a larger scale a longitudinal section of the juice outlet and the mash inlet of the press.

A device for filling of the pressing goods into the basket, and for removing the juice from the two juice collecting chambers 25 and 26 is visible particularly in FIGS. 2 and 3. A filling pipe 28 opening into the pressing space 17 coaxially with the axis 27 of the basket and an outlet pipe 29 coaxially surrounding the filling pipe 28 and connected thereto by ribs 30 form together a double pipe section 32. The outlet ducts 33 between the longitudinal ribs 30 are communicating with the juice collecting chamber 26. This double pipe section 32 is rotatably mounted in a fixed connecter head 34, a supply pipe 35 for the pressing goods being connected in fluidtight manner with the filling pipe 28, and a juice discharge tube 36 being connected in fluidtight manner with the outlet pipe 29. The supply pipe 35 is destined for connection with a mash pump, while the discharge tube 36 is destined for connection with a juice container. A vent pipe 37 connects the juice discharge tube 36 with the open air.

FIG. 4 shows that the juice collecting chamber 26 is divided by four radial partitions 38 into four sector-shaped chambers 39, the partition walls 38 being connected in fluidtight manner with the filling pipe 28 and with the opposite counterpressure plate 8 and mounting plate 15'. The juice flowing out of the pressing space 17 through the openings 24 of the mounting plate 15' will collect in the sector-shaped chambers 39 of the collecting chamber 26, and upon rotation of the pressing basket the juice flows from that of the rotation chambers 39 which is at the top into the outlet ducts 33 and to the discharge tube 36.

Figure 5:
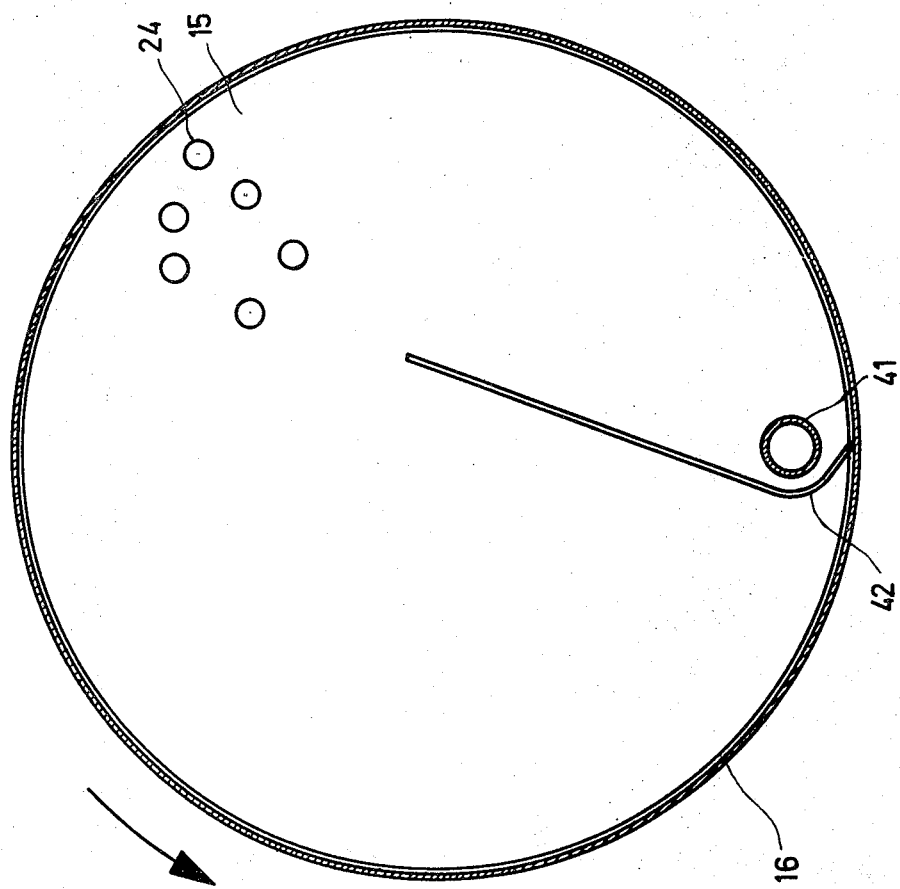
FIG. 5 is a transverse section along the line V-V through the juice collecting chamber adjoining the pressure plate.

When the pressure plate 13 is axially moved, a tube 40 carried by this plate with one end opening into the juice collecting space 25, while its other end is closed, is telescoping over a tube 41 of smaller diameter carried by the mounting plate 15' adjacent the counterpressure plate 8. By the intermediary of the two tubes 40 and 41, the juice collecting chamber 25 is continuously in communication with the juice collecting chamber 26. The juice flowing through the openings 24 of the mounting plate 25 is collecting at the bottom of the juice collecting chamber 25 and upon rotation of the pressing basket 18, the juice is guided by a baffle plate 42 (FIG. 5) which is abutting with one end in fluidtight manner against the basket cylinder 16 and laterally against the pressure plate 13 and the adjacent mounting plate 15, into the tube 40 of greater diameter, from which the juice can flow through the tube 41 of smaller diameter to the opposite juice collecting chamber 26.

In the modification shown diagrammatically in FIGS. 6 and 7 the device for supplying the pressing goods and for discharging the extracted juice comprises an outlet sleeve 29a inserted coaxially with the axis 27 of the pressing basket into the juice collecting chamber 26. Similar to the first described example, the juice collecting chamber 26 is divided by four partition walls 38' into four sector-shaped chambers 39', while a baffle plate similar to the plate 42 in FIG. 5 will be provided in the opposite juice collecting chamber not shown. A bifurcated pipe section 45 extends into the discharge sleeve 29a and is divided by a partition 44 into a juice outlet 46 communicating by an opening 47 with that of the sector-shaped chambers 39' which is at the top upon rotation of the basket 16, and a pressing goods inlet 48 communicating with the pressing space 17 of the basket 16.

In a further modification according to FIG. 8 an angularly bent outlet tube 29b has a vertical section 49 and a horizontal section 50. This outlet tube 29b rotates together with the pressing basket 16. The vertical tube section 49 extends into proximity of the cylindrical basket wall 16. The horizontal section 50 is situated in the axis 27 of the basket 16 and extends out of the basket within an inlet pipe section 51 also connected to the basket and arranged coaxially therewith. A fixed suction pipe 52 is connected to the rotatable horizontal outlet tube section 50, and a fixed supply pipe 53 for the mash is connected to the rotatable inlet pipe section 51. For drawing the juice out of the juice collecting chamber 26 the suction pipe 52 will be connected with a suction pump P.

I claim:

1. A juice extraction press having a pressing basket arranged to rotate about a horizontal axis, said pressing basket including a pressing space receiving the material to be subjected to extraction pressure, means for exerting pressure on the contents of the pressing basket, said means including a rotary pressure plate at one end of the pressing basket and a rotary counterpressure plate at the opposite end of the pressing basket, a juice collecting chamber formed in said pressing basket adjacent said counterpressure plate, and a juice outlet pipe leading away from said juice collecting chamber and extending coaxially with the horizontal axis of rotation of said pressing basket.

2. A juice extraction press according to claim 1, having conveyor means provided in said juice collecting chamber and rotating with said pressing basket for delivering the juice into said juice outlet pipe.

3. A juice extraction press according to claim 2, in which said juice outlet pipe concentrically surrounds a filling pipe leading into said pressing space in the pressing basket.

4. A juice extraction press according to claim 3, in which said juice outlet pipe and said filling pipe form together a double wall pipe section rigidly connected with said counterpressure plate.

5. A juice extraction press according to claim 3 in which said double wall pipe section is rotatably mounted in a fixed connecter head provided with a juice discharge passage connected to said juice outlet pipe and with a supply pipe connected to said filling pipe.

6. A juice extraction press according to claim 1, in which a juice outlet sleeve is inserted into said juice collecting chamber coaxially with the axis of rotation of said pressing basket and is provided with openings registering with an opening of a fixed juice outlet pipe upon rotation of said basket.

7. A juice extraction press according to claim 6, in which a fixed bifurcated pipe section is divided by a partition into said juice outlet and into an inlet opening into the pressing basket.

8. A juice extraction press according to claim 1, in which said juice outlet pipe partly extends within an inlet pipe leading into the pressing basket.

9. A juice extraction press according to claim 7, in which an angularly bent juice outlet pipe has one pipe section ending in proximity to the cylindrical wall of the pressing basket and the other section extending within said inlet pipe.

10. A juice extraction press according to claim 2, in which said juice collecting chamber is divided by radial partition walls into sector-shaped spaces which communicate with said juice outlet pipe.

11. A juice extraction press according to claim 1 and comprising a second juice collecting chamber adjacent said rotary pressure plate, and a connecting conduit extending within said pressure basket in a direction parallel to the axis of rotation of said pressing basket to said first mentioned juice collecting chamber adjacent said counterpressure plate.

12. A juice extraction press according to claim 11, in which a pipe is connected to said rotary pressure plate and extends parallel with the axis of the pressing basket towards the side of the pressure plate opposite said pressing basket, said pipe, being of greater diameter than said connecting conduit and, upon movement of the pressure plate towards said counterpressure plate telescoping over said connecting conduit within the pressing basket to continuously establish a connection between said two pressure chambers.

13. A juice extraction press according to claim 12, in which a baffle plate is arranged in said second mentioned juice collecting chamber for guiding the juice collecting in said chamber towards the inlet to said telescoping pipe opening into said juice collecting chamber.

14. A juice extraction press according to claim 1, in which the juice outlet conduit is provided with a vent pipe leading into the open air.

15. A juice extraction press according to claim 9, in which said juice outlet pipe is connected to a pump for withdrawing the juice from said juice collecting chamber.